Feb. 19, 1963     U. A. MOORES     3,077,860
DAIRY BARN TRAVELING STANCHION
Filed April 11, 1960     2 Sheets-Sheet 1
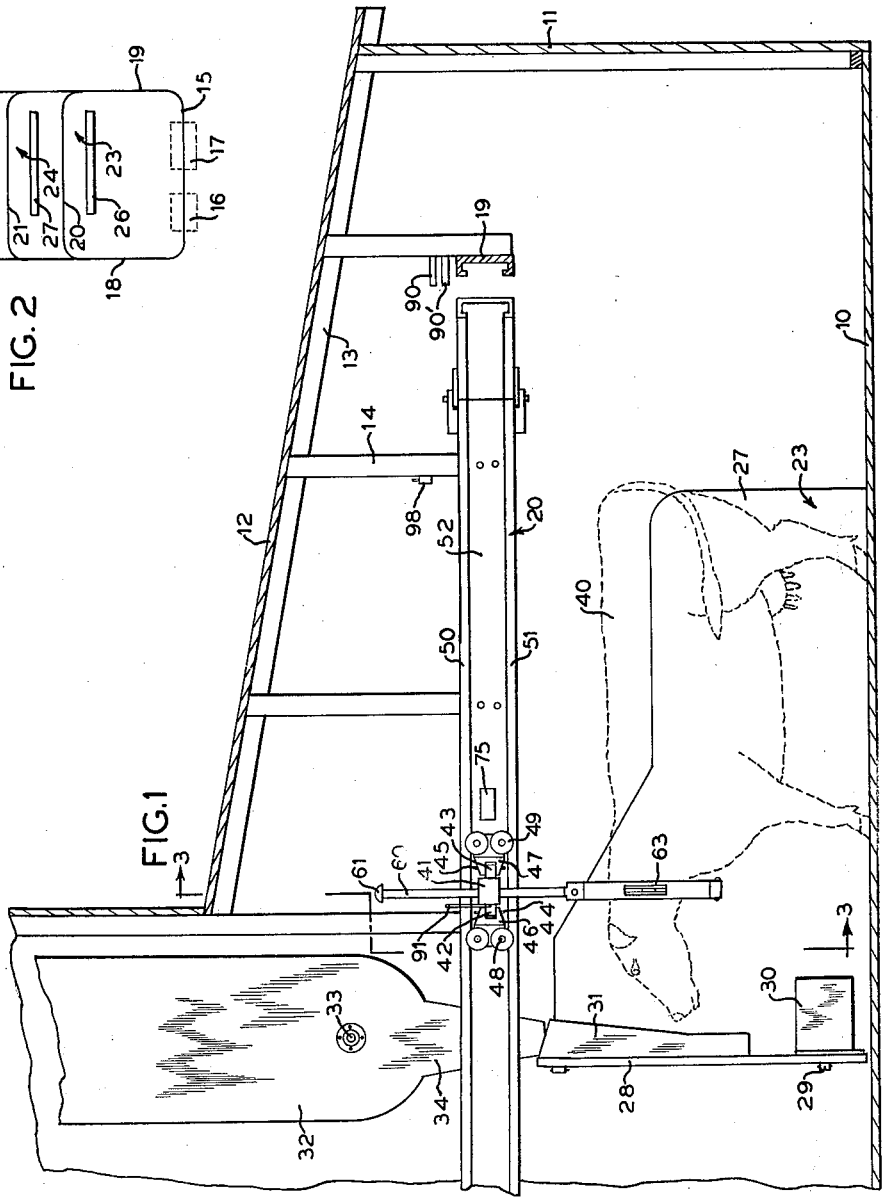
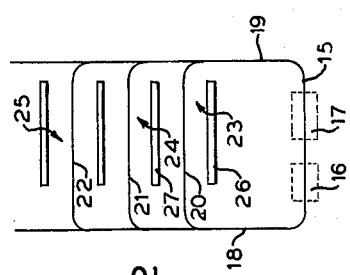
*INVENTOR:*
URBAN A. MOORES
BY: 
ATTORNEY Feb. 19, 1963
U. A. MOORES
3,077,860
DAIRY BARN TRAVELING STANCHION
Filed April 11, 1960
2 Sheets-Sheet 2
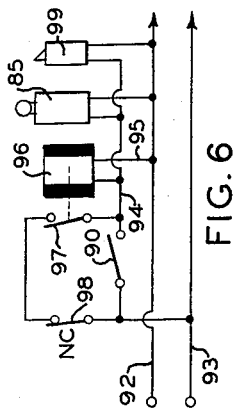
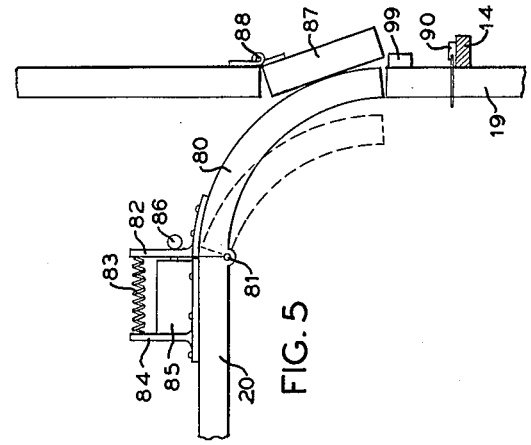
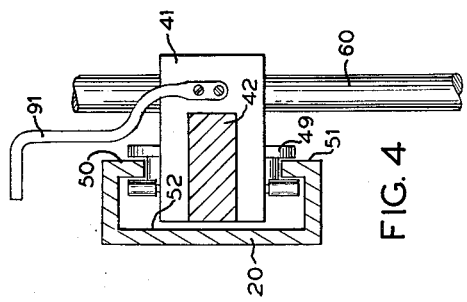
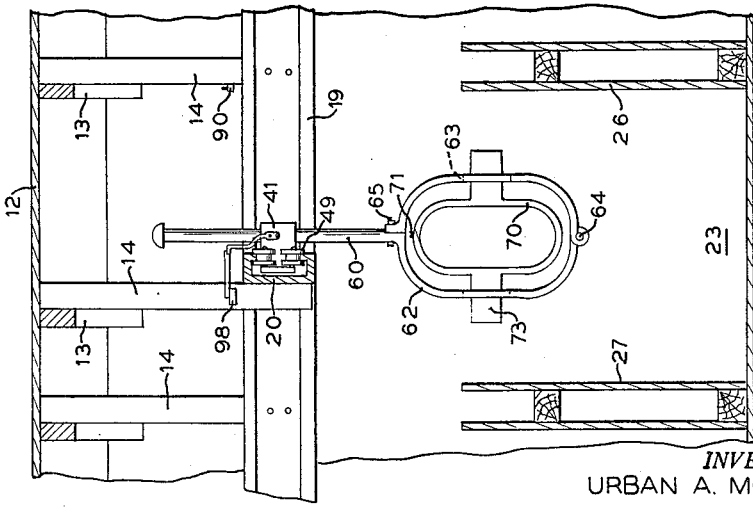
INVENTOR:
URBAN A. MOORES
BY:
ATTORNEY United States Patent Office
3,077,860
Patented Feb. 19, 1963

3,077,860
DAIRY BARN TRAVELING STANCHION
Urban A. Moores, Atlanta, Ga.
(Springfield, Maine)
Filed Apr. 11, 1960, Ser. No. 21,400
6 Claims. (Cl. 119—14.03)

This invention relates to an automatic dairy barn system, and is more particularly concerned with an apparatus for automatically tending cattle or other livestock in a barn.

In the past, considerable labor has been involved in arranging cows in their respective stalls and in leading the cow to and from a position where the cow may be milked and cared for. Also, considerable labor is involved in providing food for the various cows when they are in their respective stalls.

Briefly, the present invention tends to eliminate much of the labor required in caring for the cows in the barns by providing a monorail system to which the cows are hitched, the monorail system leading to various parts of the barn and back to the respective stalls of the cows. Cooperating with the monorail system are the various yokes for the cows, each yoke having a trolley assembly which supports a vertically movable shaft from which is suspended an outer frame. An inner floating frame is carried by the outer frame and retains the neck of the cow therein. Thus, the cow is free to move its neck in a limited vertical and horizontal path. The cow, however, can only travel in a predetermined path prescribed by the monorail. The stall of the present invention includes an automatic feed arrangement above and to one side of the monorail passing above the stall of the cow, the automatic feed mechanism feeding into a trough carried on the door of the stall. The door of the stall is hinged by one side to the stall so that it may be moved out of position when it is desired for the cow to travel along its predetermined path and automatic controls are provided for actuating the various elements.

Accordingly, it is an object of the present invention to provide an automatic dairy barn system which will reduce the amount of labor normally required to care for the cattle or cows retained in the barn.

Another object of the present invention is to provide in a dairy barn system, a new and novel yoke for cows.

Another object of the present invention is to provide in a dairy barn, an automatic feed mechanism which will automatically feed a predetermined amount of food to a cow without interfering with the operation of its stall.

Another object of the present invention is to provide an automatic dairy barn which is inexpensive to manufacture, durable in structure and efficient in operation.

Another object of the present invention is to provide an automatic dairy barn which will handle by machinery much of the work previously requiring human labor.

Another object of the present invention is to provide a yoke for a cow which, while retaining the cow in a predetermined position, will permit relatively free movement of the head of the cow in a limited path both horizontally and vertically whereby the cow experiences little discomfort in being connected to the yoke.

Other and further objects, features and advantages of the present invention will become apparent from the following description when taken in conjunction with the accompanying drawings wherein like characters of reference designate corresponding and similar parts throughout the several views, and wherein:

FIG. 1 is a vertical sectional view of a portion of the automatic dairy barn constructed in accordance with the present invention.

FIG. 2 is a schematic diagram of the monorail and stall of the present invention.

FIG. 3 is a cross sectional view taken along line 3—3 in FIG. 1.

FIG. 4 is an enlarged view of a detail showing a cross sectional view of the monorail with the trolley being carried thereby.

FIG. 5 is a fragmentary plan view of a portion of the monorail system of the present invention.

FIG. 6 is a schematic electrical diagram for one stall in the present system.

Referring now in detail to the embodiment chosen for the purpose of illustrating the present invention, it being understood that the present invention in its broader aspects is not limited to the exact details herein depicted, numeral 10 denotes the floor of the automatic dairy barn, having sides 11 and a roof 12. The roof 12 is supported by suitable beams which also provide support for a plurality of spaced straps 14 appropriately disposed throughout the barn and supporting a horizontally disposed monorail denoted generally by numeral 15.

As shown diagrammatically in FIG. 2, the monorail 15 forms a plurality of closed circuits or loops which may include, in series, a plurality of stalls or zones, such as a washing stall 16 and a milking parlor 17, at the central portion of the loop formed by the monorail 15. The monorail 15 also includes an entrance track 18 which leads to the stalls 16 and 17 and a return track 19 which leads from the stalls 16 and 17. Arranged in parallel between the track 18 and the track 19 are a plurality of stall tracks 20, 21 and 22 which lead above the individual stalls for the respective cows, such as stalls 23, 24 and 25. Each individual stall, such as stall 23, includes the usual sides, such as sides 26 and 27, mounted on floor 10 and extending upwardly therefrom on opposite sides of the stall track, such as track 20.

Each individual stall, such as stall 23, also includes a front door 28, which is hinged by hinges 29 to one side, such as side 27 of the stall 23. The door 28 is adapted to swing from an open position to a closed position, the door being in closed position in FIG. 1.

Carried by the door 28, at its lower inner portion, is a trough 30 which is fed from a vertical chute 31 mounted on door 28 above the trough 30 and passing to one side of the track 20. The chute 31 is a hollow rectangular member provided with a tapered upper end which is inclined downwardly and inwardly toward the inside of the stall. Above the door is a hopper 32, the hopper 32 being provided with a volumetric measuring device, such as a plurality of paddles (not shown) mounted on shaft 33 or other conveyor whereby a measured amount of food may be discharged by gravity to the nozzle 34 of the hopper. It wi'l be observed in FIG. 1 that the nozzle 34 of the hopper 32 is arranged vertically below the hopper 32 and passes immediately behind the track 20 to terminate below the plane of the upper portion of the chute 31 but above the lower portion thereof. The chute 31 is aligned with the nozzle 34 and is automatically swung into registry with the end of the nozzle 34 when the door 28 is closed. Thus, when the door is closed and the automatic feed mechanism is actuated, such as by rotation of shaft 34, a measured amount of feed will be fed from the hopper 32 through the nozzle 34 and the chute 31 into the trough 30. When, however, the door 28 is swung open, the trough 30 and the chute 31 remain with the door and are hence moved out of the position shown in FIG. 1.

The stalls are of such dimensions as to receive, respectively one cow per stall, such as cow 40 in stall 23, in a position to feed in trough 30 when the door 28 is closed. The rear portion of the stall 23, however, is open to permit cleaning of the stall.

According to the present invention, the monorail system carries a plurality of hitch or yoke assemblies which correspond to the number of stalls provided in the system. Each hitch assembly is carried by a trolley assembly, such as seen in FIG. 1, the trolley assembly comprising a central block 41 having a pair of ears 42 and 43 which project from opposite sides of the block 41. The ears 42 and 43 receive through appropriate vertical bores therein pivot pins 44 and 45, respectively. Connected to the respective pivot pins 44 and 45 are the bifurcated wheel blocks, from which project horizontally disposed, vertically aligned stub shafts 48. These stub shafts receive for rotation the trolley wheels 49. The arrangement of the trolley assembly is such that the wheels 49 ride along the upper and lower flanges 50 and 51 of the monorail 15, the wheel blocks 46 and 47 supporting the block 41 which projects outwardly from flanges 50 and 51. By the provision of pivot pins 44 and 45, the trolley assembly is free to travel along curved paths of the monorail 15 while the block 41 travels adjacent the web 53 of monorail 15.

Outwardly of the monorail 15, the blocks, such as block 41, are provided with a vertical aperture which receives for slidable movement a retaining bar, such as bar 60. The bar 60 is provided at its upper end with an enlarged head 61 so that the bar may not be inadvertently withdrawn through the aperture in block 41. At the lower end of the bar 60 there is provided an outer yoke 62. The yoke 62 is generally elliptical in shape, having a pair of spaced vertical sides provided with elongated slots, such as slot 63. The yoke 62 is provided at its bottom portion with a hinge 64 and at its top portion with a shackle bolt whereby upon the removal of bolt 65, the half section of the outer yoke 62 may be pivoted outwardly about the hinge 64. The inner yoke 70 is a flexible frame member which is adapted to be wrapped loosely around the neck of a cow 40, and is provided with a bolt 71 for securing the two ends of the inner yoke 70 together. As best seen in FIG. 2, the inner yoke 70 includes a pair of vertical sides which extend on opposite sides of the neck of the cow, which sides are provided with opposed outwardly extending arms 73 which project respectively through the slots 63. It will be understood that the inner yoke 70 is substantially smaller than the outer yoke 62 and hence is essentially free floating within the outer yoke 62. However, the movement of the inner yoke is limited by the outer yoke.

The inner yoke 70 is adapted to remain on the cow 40 for an extended period of time and is essentially a relatively lightweight member which causes little discomfort to the cow. When it is desired that the cow be installed on the yoke assembly, the bolt 65 is removed and the cow is properly positioned so that one of the arms 73 may project through a slot 63 in the rigid section of the outer yoke 62. Thereafter, the pivoted section of the outer yoke 62 is returned to its original position whereby the other arm 73 projects through the other slot 63 and bolt 65 again is installed, as illustrated in FIG. 3. Thus, relatively rapid engagement or disengagement of the cow is accomplished.

It will be understood that when the cow wishes to lie down in the stall, the bar 60 is sufficiently slidable in the block 41 to permit vertical movement of the yoke assembly. If the cow wishes to move in a limited direction either forwardly or rearwardly, the trolley assembly is adapted to travel freely on the monorail and hence will be carried by the bar 60 to an appropriate position.

To prevent the cow from backing out of the stall 23, a suitable spring latch, such as latch 75, may be provided within the web 62 of the track 20.

It will be understood by those skilled in the art that such electrical controls as are desirable may be installed on my automatic dairy barn system. For example, the automatic feed in hopper 32 may be electrically actuated in a timed sequence so that each cow will be uniformly fed. Also, the door 28 may be opened and closed electrically if desired. Also, any suitable electrical switching arrangement may be employed on the monorail between the stall tracks 20, 21 and 22 and the tracks 18 and 19. For example, in FIG. 5 I have illustrated a suitable switch which includes a curved portion of track 80 abutting track 20 and hinged thereto by a pair of hinges at the upper and lower junction of the front surface, such as hinge 81. The back section of the curved track 80 is provided with an outwardly extending bracket 82. The bracket 82 is urged in a clockwise direction in FIG. 5 by a spring 83 mounted on track 20 by a bracket 84. A solenoid 85 carried by bracket 84 and track 20 has an arm 86 which urges bracket 82 against spring pressure of spring 83 in a counterclockwise direction when the solenoid 85 is actuated. Thus, the curved track 80 will be swung in a counterclockwise direction to the position shown in full lines in FIG. 5.

So that the curved track 80 may align itself with the return track 19, a section 87 of the return track 19 is cut out of the return track and is hinged thereto by a hinge 88, the hinge 88 being of a spring loaded type such as to return the track section 87 to its original position when the curved track 80 is moved to its broken line position shown in FIG. 5.

It will also be understood that suitable curved tracks 89 are provided between the tracks 20, 21 and 22 and the track 18.

It will be observed in FIG. 1 that above the return track 19 at spaced intervals respectively are a plurality of normally open switches 90, 90', each switch being immediately in front of a track section 87. The switches 90, 90', etc. are preferably progressively lower along track 19 so as to cooperate with switch actuators, such as actuator 91 on block 41.

As seen in FIG. 6, current from wires 92 and 93 is supplied when the switch 90 is closed, via wires 94 and 95 to the coil 96 of a hold down relay. The hold down relay, when energized, closes a switch 97 in series with a normally closed cut off switch 98, switches 97 and 98 being in parallel with switch 90.

Thus, when switch 90 is momentarily closed, then opened, energizing coil 97, the coil 96 remains energized via switches 97 and 98 until switch 98 is opened.

In parallel with coil 96 are the solenoids 85 and 99. Thus the coil 97 and solenoids 85 and 99 are simultaneously energized and deenergized.

The switch 98 is arranged above the track 20 in a horizontal plane with the switch 90 and the solenoid 99 arranged as shown in FIG. 5 to latch section 87 closed.

In operation, the actuators 91 are arranged at different particular heights for different particular cows 40, each such actuator 91 being at a selected height to strike only one particular switch 90 or 90' etc. and one particular switch 98. Thus with the track 19 open, the cow 40 will walk down the barn until its actuator 91 strikes its individual switch, say switch 90, which energizes the solenoids 85 and 99. This causes the curved track 80 to swing to the position shown in full lines in FIG. 5 and direct the cow 40 into its stall 23, along track 20. When the cow enters the stall 23, actuator 91 strikes switch 98 thereby deenergizing solenoids 85 and 99. Thus, the curved track 80 swings open to its broken line position in FIG. 5 and the section 87 swings closed, being latched in the closed position by the latch of solenoid 99. In a similar manner a subsequent cow 40 may enter a subsequent stall, such as stall 24.

It will be obvious to those skilled in the art that many variations may be made in the embodiment herein chosen for the purpose of illustrating the present invention and that full resort may be had to equivalents without departing from the scope of the present invention as defined by the following claims.

I claim:
1. In an automatic barn system having a barn structure, a monorail disposed within said barn, a plurality of trolley assemblies carried by said monorail, yoke assemblies for restricting the movement of animals, said yoke assemblies being carried by said trolley assemblies, said yoke assemblies each including a yoke for tethering an animal by its neck, a bar extending upwardly from said yoke, said trolley assembly movably receiving said bar for essentially vertical movement with respect to said trolley assembly, said trolley assembly preventing any appreciable horizontal movement of said bar except along a path essentially parallel to said monorail, said monorail forming essentially a closed track having a plurality of stall tracks and an entrance and return track, said stall tracks being selectively switchable to engage said entrance and return tracks whereby the animals tethered by the respective yokes may be directed along selected stall tracks, said yoke including an inner yoke extending around the neck of a cow, arms extending outwardly from opposite sides of said inner yoke and an outer yoke extending around said inner yoke, said outer yoke being provided with slots receiving said arms of said inner yoke.

2. In an automatic barn system having a barn structure, a monorail disposed within said barn, a plurality of trolley assemblies carried by said monorail, and yoke assemblies for restricting the movement of animals, said yoke assemblies being carried by said trolley assemblies, said yoke assemblies each including a bar journaled by one of said trolley assemblies, an outer yoke carried by said bar, an inner yoke for tethering an animal by its neck, said inner yoke being movably secured to said outer yoke whereby said outer yoke defines the extent of movement of said inner yoke and the extent of movement of the bar is defined by its trolley assembly.

3. In a device of the character described, a yoke assembly comprising an inner yoke for extending around the neck of a cow, arms extending outwardly from opposite sides of said inner yoke and an outer yoke extending around said inner yoke, said outer yoke being provided with slots receiving said arms of said inner yoke.

4. In a device of the character described, a yoke assembly comprising an inner yoke for extending around the neck of a cow, arms extending outwardly from opposite sides of said inner yoke and an outer yoke extending around said inner yoke, said outer yoke being provided with slots receiving said arms of said inner yoke, said outer yoke including a yoke section separable from the remaining portion of said outer yoke whereby said inner yoke may be removed from said outer yoke.

5. In a device of the character described, a yoke assembly comprising an inner yoke for extending around the neck of a cow, arms extending outwardly from opposite sides of said inner yoke and an outer yoke extending around said inner yoke, said outer yoke being provided with slots receiving said arms of said inner yoke, and a bar extending upwardly from said outer yoke for engagement with a trolley of a monorail.

6. In a device of the character described, a yoke assembly comprising an inner yoke for extending around the neck of a cow, arms extending outwardly from opposite sides of said inner yoke and an outer yoke extending around said inner yoke, said outer yoke being provided with slots receiving said arms of said inner yoke, a monorail disposed over said yoke assembly, and a bar extending upwardly from said outer yoke and slideably connected to said monorail.

References Cited in the file of this patent

UNITED STATES PATENTS

| | | |
|---|---|---|
| 856,727 | Ruthven | June 11, 1907 |
| 1,116,220 | Betty | Nov. 3, 1914 |
| 1,154,706 | Love | Sept. 28, 1915 |
| 2,092,440 | Cain | Sept. 7, 1937 |
| 2,236,851 | Haselton | Apr. 1, 1941 |
| 2,472,122 | Polivka | June 7, 1949 |
| 2,635,555 | Hansson | Apr. 21, 1953 |
| 2,684,039 | King | July 20, 1954 |
| 2,799,245 | Ruggiero et al. | July 16, 1957 |
| 2,815,735 | Collier | Dec. 10, 1957 |

FOREIGN PATENTS

| | | |
|---|---|---|
| 16,460 | Sweden | Sept. 26, 1903 |
| 56,693 | Norway | June 15, 1936 |